(12) United States Patent
Hart et al.

(10) Patent No.: US 10,762,732 B2
(45) Date of Patent: *Sep. 1, 2020

(54) CRYPTOGRAPHIC KEY MANAGEMENT VIA A COMPUTER SERVER

(71) Applicant: Nexkey, Inc., Emeryville, CA (US)

(72) Inventors: Jason Hart, Fremont, CA (US); Matthew Patrick Herscovitch, Fremont, CA (US); Sotoudeh Hamedi-Hagh, San Jose, CA (US)

(73) Assignee: Nexkey, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/846,333

(22) Filed: Dec. 19, 2017

(65) Prior Publication Data

US 2018/0211456 A1    Jul. 26, 2018

Related U.S. Application Data

(63) Continuation of application No. 14/498,490, filed on Sep. 26, 2014, now Pat. No. 9,870,659, which is a
(Continued)

(51) Int. Cl.
*G07C 9/21* (2020.01)
*G08C 17/02* (2006.01)
(Continued)

(52) U.S. Cl.
CPC ............... *G07C 9/21* (2020.01); *G08C 17/02* (2013.01); *H04B 5/0012* (2013.01);
(Continued)

(58) Field of Classification Search
CPC .......... G07C 9/00; G07C 9/0015; G07C 9/21; H04B 5/0012; E05B 2047/0057; E05B 47/026; E05B 47/0673
(Continued)

(56) References Cited

U.S. PATENT DOCUMENTS

| 4,031,434 A | 6/1977 | Perron et al. |
| 4,712,398 A | 12/1987 | Clarkson et al. |

(Continued)

FOREIGN PATENT DOCUMENTS

| EP | 0238360 A2 | 9/1987 |
| EP | 0388997 A1 | 9/1990 |

(Continued)

OTHER PUBLICATIONS

International Search Report and Written Opinion, PCT/AU2010/000508, dated Jul. 5, 2010 (15 pages).
(Continued)

*Primary Examiner* — Vernal U Brown
(74) *Attorney, Agent, or Firm* — Patent Law Works LLP

(57) ABSTRACT

Some embodiments include a computer server. The computer server can be configured to: add a security system associated with a user account; provision one or more communication devices associated with the security system; configure a cryptographic key to associate at least a communication device amongst the communication devices with the security system; configure an access control file that is cryptographically signed by the computer server and encrypted with the cryptographic key associated with the security system, wherein the access control file contains permissions of the communication devices to the security system; and provide a data payload including the access control file to a first communication device of the communication devices.

13 Claims, 4 Drawing Sheets

Related U.S. Application Data continuation of application No. 13/318,526, filed as application No. PCT/AU2010/000508 on May 3, 2010, now abandoned.

(51) Int. Cl.
  *H04B 5/00* (2006.01)
  *E05B 47/00* (2006.01)

(52) U.S. Cl.
  CPC .......... *E05B 2047/0057* (2013.01); *E05B 2047/0094* (2013.01); *H04B 5/0037* (2013.01); *Y10T 70/7068* (2015.04); *Y10T 70/7113* (2015.04)

(58) Field of Classification Search
  USPC ........................................... 340/5.1
  See application file for complete search history.

(56) References Cited

U.S. PATENT DOCUMENTS

| | | | |
|---|---|---|---|
| 4,837,822 A | 6/1989 | Crosley et al. | |
| 5,617,082 A | 4/1997 | Denison et al. | |
| 5,782,118 A | 7/1998 | Chamberlain et al. | |
| 6,072,402 A | 6/2000 | Kniffin et al. | |
| 6,310,411 B1 | 10/2001 | Viallet | |
| 6,380,843 B1 | 4/2002 | Guerin et al. | |
| 6,731,731 B1 | 5/2004 | Ueshima | |
| 6,865,916 B2 | 3/2005 | Goldman | |
| 7,073,359 B2 | 7/2006 | San Jose Santamarta | |
| 7,716,483 B2 | 5/2010 | Sozzani et al. | |
| 8,035,478 B2 | 10/2011 | Lee | |
| 8,052,059 B2 | 11/2011 | Saito et al. | |
| 8,146,394 B2 | 4/2012 | Krueger | |
| 8,274,365 B2 | 9/2012 | Piccirillo et al. | |
| 8,756,431 B1 | 6/2014 | Despain et al. | |
| 9,870,659 B2 * | 1/2018 | Hart | G07C 9/00015 |
| 2002/0014950 A1 * | 2/2002 | Ayala | E05B 5/003 340/5.6 |
| 2003/0179073 A1 | 9/2003 | Ghazarian | |
| 2006/0164206 A1 | 7/2006 | Buckingham et al. | |
| 2007/0055878 A1 * | 3/2007 | Sandhu | H04L 9/32 713/171 |
| 2007/0131005 A1 | 6/2007 | Clare | |
| 2007/0176738 A1 | 8/2007 | Horler | |
| 2008/0252415 A1 | 10/2008 | Larson et al. | |
| 2008/0316120 A1 | 12/2008 | Hirota et al. | |
| 2011/0154491 A1 * | 6/2011 | Hernacki | G06F 21/568 726/23 |
| 2011/0252240 A1 * | 10/2011 | Freedman | H04L 63/02 713/169 |
| 2012/0096909 A1 | 4/2012 | Hart et al. | |

FOREIGN PATENT DOCUMENTS

| | | |
|---|---|---|
| EP | 0846823 A1 | 6/1998 |
| WO | 2006016149 A1 | 2/2006 |

OTHER PUBLICATIONS

GB Examination Report, GB 1118268.0, dated Sep. 11, 2014 (1 page).

\* cited by examiner

CRYPTOGRAPHIC KEY MANAGEMENT VIA A COMPUTER SERVER

CROSS-REFERENCE TO RELATED APPLICATION(S)

Please refer to the Application Data Sheet submitted herewith for the cross-reference information.

RELATED FIELDS

The present invention relates to cryptographic authentication. More particularly, it concerns a system and method of managing access control via cryptographic authentication.

BACKGROUND

Electronic locking systems requiring an electric current to engage/disengage a lock member are incorporated in a wide variety of environments where security is of importance. Electronic locking systems are generally preferred over traditional physical key-and-lock mechanisms given the increased functionality and greater security.

DISCLOSURE OVERVIEW

Increased functionality and security of electronic locks over traditional key locks can be because of microprocessor technology being employed in the locking system. Microprocessor technology may allow selective access to a locking mechanism with greater confidence in the person or object requesting access, during certain times of the day, and even has the ability to create an audit log of the persons accessing the lock.

An additional advantage of electronic locking systems allows users to employ 'wireless' keys using a relatively simple RF transmitter and receiver. Basic security such as rolling or hopping code, may be implemented into this type of locking system.

Some embodiments include a computer server. The computer server can be configured to: add a security system associated with a user account; provision one or more communication devices associated with the security system; configure a cryptographic key to associate at least a communication device amongst the communication devices with the security system; configure an access control file that is cryptographically signed by the computer server and encrypted with the cryptographic key associated with the security system, wherein the access control file contains permissions of the communication devices to the security system; and provide a data payload including the access control file to a first communication device of the communication devices.

Some embodiments include a method of operating a computing device to implement a security system. The method can include: provisioning the computing device with an authentication certificate capable of uniquely identifying the computing device and capable of being updated, wherein the authentication certificate is a mutual public key infrastructure (PKI) authentication certificate; sending identifying information, based on the authentication certificate, associated with the computing device to a customer communication device to validate the security system implemented by the computing device; receiving an access request and a customer signature from the customer communication device in response to the customer communication device validating the computing device; and validating the access request based on the authentication certificate in response to receiving the customer signature.

BRIEF DESCRIPTION OF THE DRAWINGS

THE invention will now be described in a non-limiting manner with respect to a preferred embodiment in which.

DETAILED DESCRIPTION OF PREFERRED EMBODIMENTS

Figure 1:
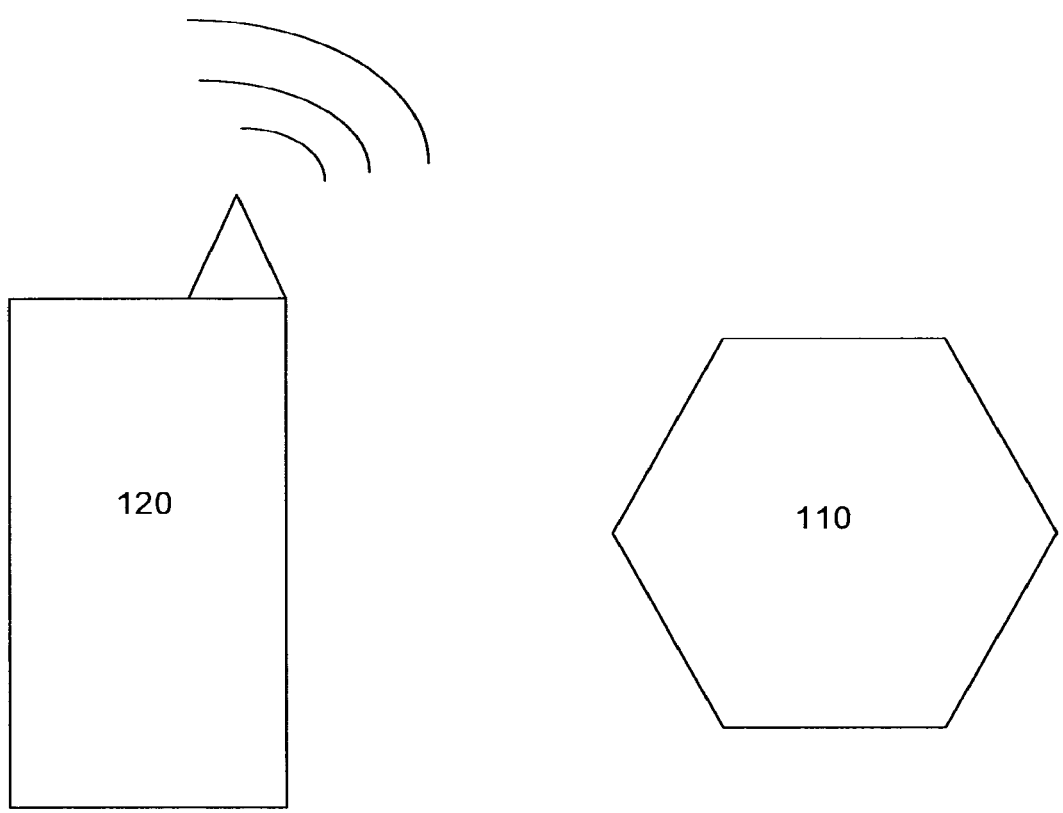
FIG. 1 is an overview of a preferred embodiment of the present invention.

In the following discussion and in the claims that follow, the terms "including" and "includes" or "comprising" and "comprise" are used, and are to be read, in an open-ended fashion, and should be interpreted to mean "including, but not limited to . . . ".

Additionally, in the following discussion and in the claims that follow, the terms "electronic lock" and "electronic locking mechanism" are to be given a broad meaning, and refer to any locking device that is actuated (engages and/or disengages) by means of an electric current. An electronic lock or electronic locking mechanism in accordance with the present invention may or may not include a microprocessor.

Further, in the following discussion and in the claims that follow, the term "key" is to be given a broad meaning, and generally refers to any device that actuates the electronic lock or electronic locking mechanism. A key in accordance with the present invention may or may not include a microprocessor.

According to a first aspect of the invention, there is provided an electronic locking system that includes a lock with a locking member and a communication device. The communication device remotely powers the lock to actuate the locking member.

In accordance with a further aspect of the invention, there is provided an electronic lock. Power to actuate the locking member of the electronic lock is remotely supplied by a communication device.

According to still another aspect of the invention, there is provided a method for actuating a locking member of an electronic lock. The method includes the steps of receiving a RF induction field that is remotely supplied by a communication device, via an antenna communicably attached to the electronic lock. The locking member is actuated by power received from the RF induction field.

In accordance with a further aspect of the invention, the electronic lock includes at least one microprocessor, at least one solenoid, at least one antenna, and at least one capacitor. The lock further includes at least one battery, wherein the communication device remotely provides power to the lock to supplement the power supplied by the at least one battery.

The remote powering of the lock is enabled by radio field inductive technology, including ISO 14443, or ISO 15693, or RFID, or Near Field Communication technology. Further, the actuating of the locking member is subject to authentication of the communication device. The authentication includes public key cryptography or symmetrical key cryptography.

According to a further aspect of the invention, there is provided an electronic locking system that includes a lock with a locking member and at least one antenna. Suitable power to actuate the locking member is delivered through the at least one antenna received from a remote power source.

In accordance with a further aspect of the invention, there is provided an electronic lock. Power to actuate the locking member of the electronic lock is received by at least one antenna communicably attached to the electronic lock, from a remote power source.

According to still another aspect of the invention, there is provided a method for actuating a locking member of an electronic lock. The method includes the steps of receiving, via at least one antenna communicably attached to the electronic lock, an induction field, remotely supplied by a power source. The locking member is actuated by power received from the induction field.

In accordance with a further aspect of the invention, the electronic lock includes at least one microprocessor, at least one solenoid or DC motor or servo, and at least one capacitor. Further, the at least one antenna is a multi-layer antenna.

The remote power source is a communication device, and the lock further includes at least one internal power supply that may supplement the power supplied by the remote power source. The lock further includes a recharging device to recharge the at least one internal power supply.

The remote powering of the lock is enabled by radio field inductive technology, including ISO 14443, or ISO 15693, or RFID, or Near Field Communication technology. Further, the actuating of the locking member is subject to user authentication. The authentication includes public key cryptography or symmetrical key cryptography or at least one One Time Password.

An exemplary embodiment of the system of the preset invention is shown in FIG. 1, where there is provided an electronic lock 110. The lock 110 preferably includes a locking member (not shown) that is movable between a closed (engaged) position and an open (disengaged) position. Preferably, the locking member is an electromagnetic latch.

The electronic lock 110 may include a power supply, preferably a soft battery, to provide power to the mechanism and actuate the locking member from an open (disengaged) position to a closed (engaged) position, or vice versa. However, in a preferred embodiment of the present invention, the electronic lock 110 does not have a traditional power supply.

The electronic lock 110 further preferably includes at least one antenna, capable of drawing power transmitted from a remote power source, such as a near field communication device 120. The antenna is preferably a 13.56 MHz (or higher) compact antenna.

It will be appreciated that the antenna of the electronic lock may be capacitively loaded using resonant coupling to form tuned LC circuits in order to receive power.

However, such conventional configurations have traditionally not been suitable to receive an adequate and reliable amount of power to actuate a physical mechanism, such as a locking member.

Accordingly, in a particularly preferred embodiment of the present invention, the at least one antenna of the electronic lock is a multi-layer antenna that maximises electromagnetic field coupling, providing a relatively large inductance in a small area.

The electronic lock 110 in accordance with the present invention preferably further includes a microprocessor electrically connected to the locking member. The microprocessor is preferably a low power cryptographic secured processor which uses less than 5V DC and 60 mA. The microprocessor is preferably a self contained package including memory, ROM, and a power regulator in a miniature package that can be embedded inside various lock configurations, such as a locking cylinder, for example. It is to be understood that the components of the microprocessor are communicably attached to the electronic lock.

Figure 2:
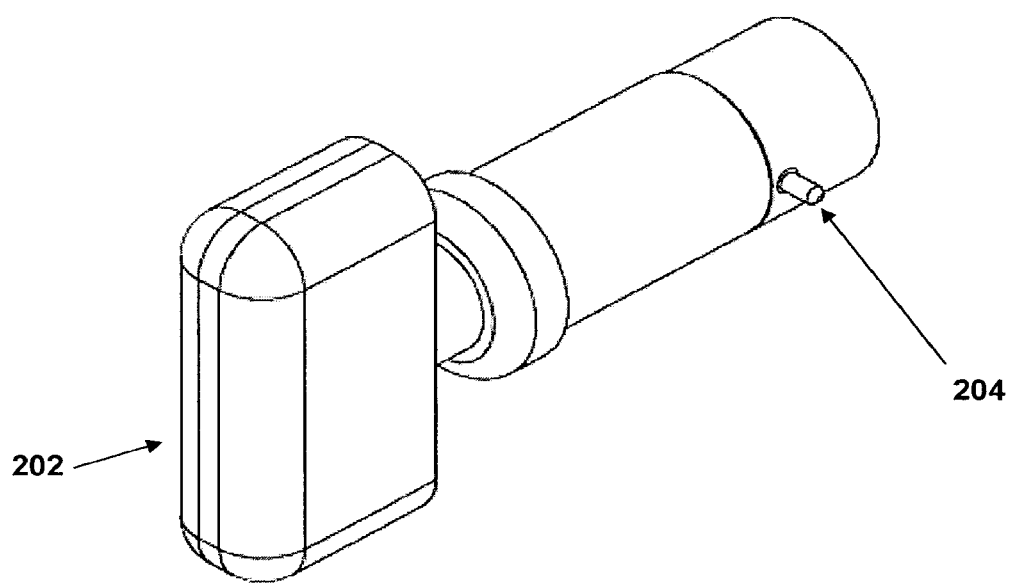
FIG. 2 is a locking mechanism according to a preferred embodiment of the present invention.

Further, it is to be understood that the electronic lock may be placed in a variety of casings in accordance with desired use. The electronic lock in accordance with the present invention may be implemented in suitable lock casings including, but not limited to, safe locks, filing cabinets, lockers, padlocks, door locks, cash boxes, vending machines, vehicle locks and deadlocks. A particularly preferred embodiment of the electronic lock mechanism is shown in FIG. 2. Rotating turn knob 202 preferably physically moves the locking member 204 once relevant power is received and the user associated with the communication device is authenticated.

The system of the present invention further includes a remote power source. The remote power source is preferably a near field communication (NFC) enabled device 120 that is self powered by means of a battery unit (or similar), and capable of building a NFC field in close proximity. It will be appreciated however, that NFC technology need not be implemented, and any short-range communication technology capable of communicating via magnetic field induction may be used. Non-limiting examples of which may include ISO 14443, or ISO 15693, or RFID technology.

The NFC-enabled communication device 120 acting as the remote power source is preferably a mobile phone (such as those currently produced by Nokia®, BENq® and Samsung®), or a phone enabled with MicroSD NFC memory cards. Alternatively, the remote power source may be a single press-button transmitter or a transmitter with a PIN pad, such as a fob (also referred to as a ring) suitably attached to a key chain, with other/additional communication functionality.

In use, the communication device 120 of the present invention delivers power to its antenna, where a current is induced and transmitted to the electronic lock 110, to be received by the at least one antenna. The microprocessor of the electronic lock 110 and the communication device 120 communicate with each other by modulating an established RF field. It is to be understood that the electronic lock and the communication device are preferably remote from each other. That is, the power delivered from the communication device to the electronic lock is remotely (wirelessly) delivered.

Preferably, an authentication exchange then takes place between the communication device 120 and the electronic lock 110. The microprocessor of the electronic lock 110 controls a solenoid or other actuating mechanism, such as a DC motor, to actuate (engage/disengage) the locking member. It will be appreciated that the actuating mechanism may be any suitable mechanical device and may also include a servo with suitable torque characteristics.

The actuating mechanism draws its power from one or more capacitors associated with the at least one antenna within the electronic lock 110, which is received from the RF field remotely generated by the remote power source.

Preferably, the at least one antenna of the electronic lock 110 is a multi-layer antenna, using a plurality of conductors, with off-set layers to reduce inherent parasitic capacitance associated with conventional stacked, single layer solenoids or flat spirals. A particularly preferred embodiment of the off-set layers of the antenna is shown in FIGS. 3*a* and 3*b*.

In order to further reduce the parasitic capacitance between antenna layers, each antenna is preferably applied on a Printed Circuit Board (PCB) with a thickness of approximately 0.05-0.08 inches (0.125-0.2 centimetres), with a preferred thickness of 0.062 inches (0.155 centimetres). The preferred thickness and the offset layout configuration maximises the quality factor and the self-resonance frequency of the antenna for proper operation at 13.56 MHz.

Figures 3A, 3B:
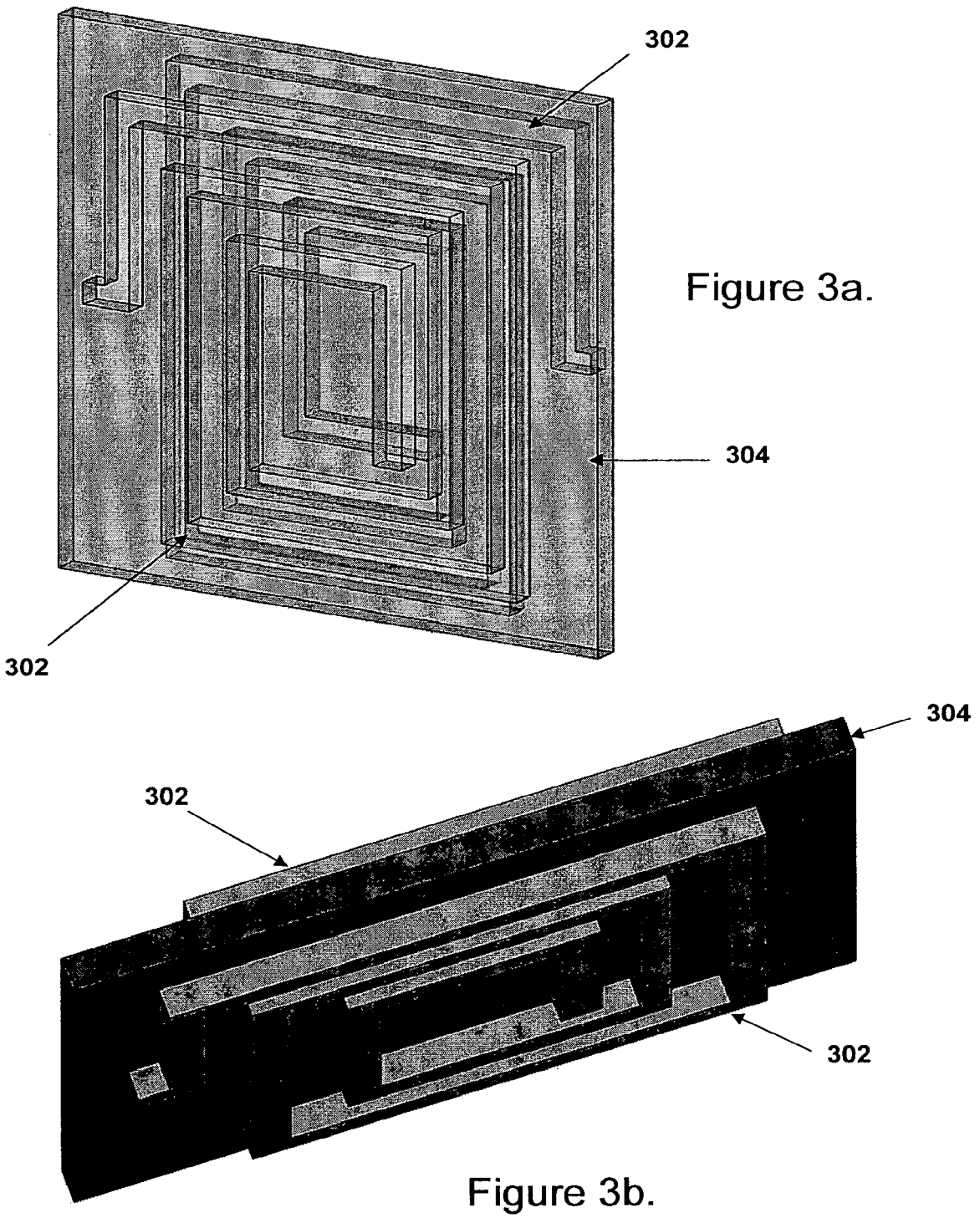
FIGS. 3a and 3b show an antenna with off-set layers according to a preferred embodiment of the present invention.

The antenna is preferably designed using suitable metal top and bottom layers 302 on a FR4 PCB 304, as shown in FIGS. 3*a* and 3*b*. As will be appreciated, if the PCB 304 is thin, the distance between the top and bottom off-set metal layers 302 is reduced and their capacitance increases. Accordingly, the overall inductance becomes insubstantial and the self-resonance frequency decreases. It is the self-resonance frequency of the antenna characteristic that becomes capacitive instead of being inductive.

Furthermore, additional layers (not shown)—such as ferrite layers, for example—can be added to the top and/or bottom layers 302 of the antenna to boost the electromagnetic fields passing through. This further adds to the multi-layer configuration, and increases the inductance and current of the antenna.

Traditionally, resonant coupling employs capacitively loaded coils to form matched LC circuits. However, in a particularly preferred embodiment of the present invention, a single capacitor is used to tune and match the at least one antenna to the NFC operating frequency of the communications device acting as the remote power source. It will be appreciated that, in the case of multiple antennas, each antenna will require its own corresponding tuning circuit facilitated by a corresponding single capacitor.

The use of a single capacitor, instead of using multiple inductor and capacitor components in an LC ladder circuit configuration, decreases the number of components required for matching and therefore reduces the need for a greater area of components on the PCB.

An antenna using an inductor L has a series resistance R due to its resistive metal inductors. Adding a series capacitance C creates a series RLC circuit with an input impedance $Z_1$ given by $$Z_1 = \frac{1}{j\omega C} + j\omega L + R = R + j\omega L\left(1 - \frac{\omega_0^2}{\omega^2}\right)$$

where $\omega_0$ is the resonant frequency defined as $$\omega_0 = \frac{1}{\sqrt{LC}}$$

When $\omega = \omega_0$, the input impedance becomes minimum and equal to resistance R and the output voltage across R becomes equal to the input voltage of the antenna. At the resonance frequency, the voltage across the capacitor C and the inductor L cancel each other and are given by $$V_C = \frac{1}{j\omega_0 C}I_1 = \frac{1}{j\omega_0 C}\frac{V_1}{R} = -jQV_1$$

and $$V_L = j\omega_0 L I_1 = j\omega_0 L \frac{V_1}{R} = jQV_1$$

where Q is defined as the quality factor. If Q is much larger than 1, then the voltage across matching capacitor C can increase to a larger volume than the voltage at the antenna.

The at least one antenna may also preferably include an adjustable regulator circuit to assist in the prevention of voltage drop and power loss, providing constant voltage over the required time to actuate the locking member. Additionally, the communication device preferably periodically initializes communication with the electronic lock to ensure a robust power connection.

Figure 4:
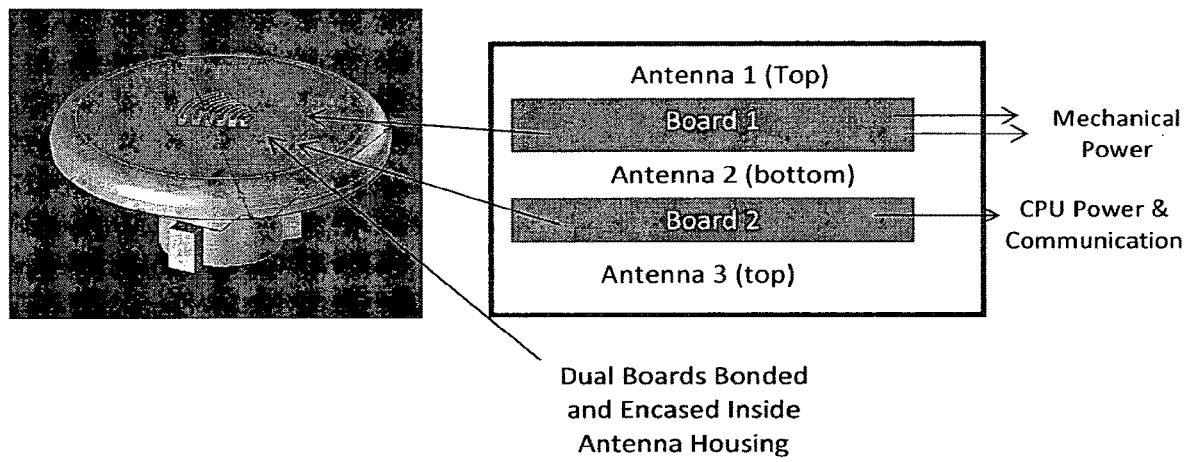
FIG. 4 is an antenna configuration according to a preferred embodiment of the present invention.

The at least one multi-layer antenna of the present invention is preferably a dual layer antenna. However, it will be appreciated that a three or more layer antenna could be adapted for use, as shown in FIG. 4. As will be appreciated, the electronic lock may include various functions that require power, in addition to the actuating mechanism. For example, the electronic lock may include additional processor circuits to control a LCD screen, or a small illuminating device to assist the user in identifying the location of the lock. The antenna design of the present invention may be adapted to accommodate the additional power requirements of a CPU, without resorting to a hard-wired power source, or supplementary battery.

Further, and as demonstrated in FIG. 4, the multi-layer design of the at least one antenna of the present invention advantageously allows for the provision of particular layers to draw power for the mechanism and other relevant functionality as mentioned above, while other layers may be used to transmit and receive data.

The at least one antenna preferably includes a hollow spiral structure, or other suitable design, to concentrate the electromagnetic field into the desired position, such as the centre of the antenna, to maximise the received power. It will be appreciated that the width of the spirals may be variously adapted to enhance received power and minimise ohmic losses. Each antenna may also be embedded inside suitable magnetic materials, such as ferrite for example, to boost the electromagnetic fields crossing the antenna. The current generation and performance of the antenna are enhanced with such a configuration.

It will be appreciated that the disengaging of the locking member may itself allow access to the desired room/compartment/facility etc. Alternatively, an authorised person may be required to physically turn a handle-type arrangement to gain access once the electronic lock is disengaged.

As described above, and in accordance with a particularly preferred embodiment of the present invention, the electronic lock does not include a power supply, such as a replaceable battery. The electronic lock remotely draws the required power to actuate the locking member from an RF field generated by a remote power source such as a communication device. There is no physical electrical connection required to actuate the lock.

However, it will be appreciated that certain lock configurations may require some form of internal or attached power supply, such as a battery. In this regard, and in accordance with an embodiment of the present invention, the RF field generated by a communication device may supplement the power supply of the electronic lock. The internal or attached power supply of this configuration may be suitable to provide all of the necessary power to engage/disengage the locking member, or may only provide a portion of the necessary power which can be 'topped up' by the RF field generated by the communication device. Such a configuration may be used on emergency doors, for example.

In a particularly preferred embodiment of this aspect of the invention, the electronic lock further includes a recharging device. The recharging device receives power via the at least one antenna of the electronic lock, and recharges the internal or attached power supply. Preferably, the communication device, acting as the remote power supply, is placed in the vicinity of the lock in accordance with the relevant radio technology field distance (for example, in the range of approximately 10 centimetres for NFC devices), for a longer period of time than would usually be required to actuate the locking member. The electronic lock would preferably inform the user of the communication device by means of an alarm or display for example, that the internal power supply requires recharging.

To enhance the security and credibility of the system, an authentication process is desired. In accordance with a particularly preferred embodiment of the present invention, the authentication process is based on the concept of public/private keys.

Preferably the electronic lock contains a cryptographic secure (smartcard-like) processor which has been provisioned with an authentication certificate. It is capable of validating engage or disengage requests based on a customer signature and is also preferably capable of uniquely identifying itself as a customer lock, for example, using mutual PKI (Public Key Infrastructure) authentication.

Further, the processor is preferably capable of validating One Time Password authentication requests based on relevant industry standards. It will be appreciated that the microcode is updatable, in similar regard to a smartcard, to evolve with industry standards. Additionally, the cryptographic data is updatable in the field to evolve with cryptographic key length requirements and processing power of attacking systems.

As discussed above, the communication device according to the present invention may be any suitable device, such as a mobile phone or a customised radio transmitter in the form of a key fob. Further, the communication device may also be a support device for a passive instrument, such as a smartcard or microprocessor identity card. The support device in the form of a badge holder for example, is preferably configured to include an internal power source that can provide suitable power to actuate a locking member in the manner described above.

Additionally, and in a particularly preferred embodiment of this aspect of the invention, the badge holder can also provide suitable power to the smartcard or other microprocessor identity card inserted into it. In this manner, the badge holder functions as a smartcard reader that may connect to a computing device and be used for smartcard functionality, such as PKI facilities.

As will be appreciated from the foregoing, the communication devices are preferably equipped with a secure storage area and their own private cryptographic key, or may act as a suitable reader in the form of a badge holder to retrieve/translate this information. The devices are capable of receiving configuration and cryptographic information from a Central Cryptographic Key Management security Server (CCKMS).

The CCKMS manages the provisioning of communication devices and the management of access control of these devices to the electronic locks.

For example, when a new lock is added to a person's account inside the CCKMS and that lock is associated with one or multiple communication devices, an access control file is cryptographically signed by the CCKMS and encrypted with the communication devices' key. The data block is transmitted to the communication device via suitable means, such as text message, download, Over-the-Air update, manual file etc.

When the communication device receives a data block it is able to decrypt it using its private key. The device further validates that the data block and contents were signed by the CCKMS. The data is then accepted and stored preserving the digital signatures from the CCKMS. An access control file contains the permissions that respective communication devices have to specific locks and specific user groups.

Once the communication device is presented to an electronic lock, and power via induction is remotely provided, the lock transmits its identifying information and the communication device determines if it has permission to actuate the locking member.

If the communication device determines that the electronic lock is valid and it has previously established a symmetrical key pair with the lock, it begins an authentication process request and may skip the establishment step.

For a new relationship between an electronic lock and a communication device, an establishment procedure of symmetrical keys and access privileges occurs. Preferably, the communication device transmits access control data that it has received from the CCKMS to the electronic lock. The lock in turn determines if it has a more current version of that access control data, and if the data is new it accepts it and validates the CCKMS signature.

The electronic lock then receives the public key of the communication device and validates that it was correctly signed with the CCKMS private key. The lock subsequently prepares a symmetric encryption key and a unique identifying number for the communication device, encrypts the key and number with the public key of the communication device, and then transmits it to the communication device.

The communication device decrypts the symmetric key and unique identifying number using its private key. The symmetric key is then used to generate a One Time Password and transmits that to the electronic lock with the unique identifying number of the communication device.

Finally, the electronic lock internally looks up the identifying number, the access control list and the unique symmetric key for that device. Once the One Time Password provided is validated, the locking member may be actuated.

Whilst public key infrastructure has been described as the authentication process for the present invention, it will be appreciated that other cryptographic secure authentication processes may be employed.

It will be appreciated that embodiments of the present invention may be used to access locking mechanisms that require the presentation of two or more electronic keys. Two or more communication devices may be presented simultaneously to the electronic lock. In this instance, each device is recognised and communicated with individually.

Alternatively, a first communication device is presented to the electronic lock and provides suitable power as described above. The electronic lock may or may not authenticate the device, but will inform the user of the first communication device that a second communication device is required. Once the first communication device is removed, the electronic lock powers down. The locking member of the electronic lock may be actuated once the second communication device is presented and authenticated.

It will be further appreciated that an unauthorised user may gain access to a particular environment, where an authorised user provides authority. The authority may be provided through a suitable service to generate a four to twelve digit one time access code, for example. The access code is based on a unique symmetrical key that is preinstalled in the electronic lock.

The authorised person would preferably provide the one time access code to the unauthorised person over a suitable secure link to the unauthorised user's communication device. Alternatively, the one time access code could be provided over an unsecure network, such as by telephone or email. Once the unauthorised user presents their communication device to the electronic lock, the one time access code is extracted/provided to gain a single access to actuate the locking member. Further security measures to enhance the integrity of the system will be apparent to those of skill in the art. For example, the time the access code was generated by the service may be embedded inside the transmitted code to determine validity.

There are a number of advantages using cryptographic keys to determine access to electronic locking mechanisms. For example, such keys are not duplicated, and may be provisioned or revoked securely and easily. That is, if a communication device is lost or stolen, it can be revoked from the system. Another trusted communication device may be employed which can deliver an updated payload from the CCKMS to respective electronic locks. The payload may include a list of authorized communication devices, as well as a time stamp. This time stamp is validated for all new establishment requests to ensure that an expired or de-authorized communication device cannot be re-established with an electronic lock.

Another advantage of using the keys of the present invention is relevant persons may access an audit log of the electronic lock. In accordance with an embodiment of the present invention, the audit log of a particular electronic lock may be accessed and read on a person's communication device, via the RF field.

The electronic lock stores an audit trail, and upon the request of an authorised communication device, the lock transmits the information from its storage to the device. The communication device can then display the audit trail on its screen and/or transmit the information to another storage location, such as a web site or data base.

A further advantage of the present invention allows administrators to gather/group users and assign multiple locks to be part of one group. Access privileges may be based on any number of considerations; for example, time of day per lock or group.

An additional advantage of the present invention allows authorized communication devices to provide Over-the-Air configuration and software updates to the electronic lock.

It is to be understood that the above embodiments have been provided only by way of exemplification of this invention, and that further modifications and improvements thereto, as would be apparent to persons skilled in the relevant art, are deemed to fall within the broad scope and ambit of the current invention described and claimed herein.

What is claimed is:

1. A computer server comprising:
a processor configured to:
add a security system associated with a user account, the security system being associated with one or more communication devices and being distinct from the computer server;
provision a first communication device of the one or more communication devices associated with the security system by:
transmitting, by the first communication device to the security system, a public key of the first communication device;
generating, by the security system, an encrypted symmetric encryption key and an encrypted identifying number using the public key of the first communication device;
configuring an access control file that is cryptographically signed by the computer server and encrypted with a key of the first communication device associated with the security system, wherein the access control file includes permissions of the first communication device to the security system; and
transmitting a data payload including the access control file to the first communication device.

2. The computer server of claim 1, wherein the processor further configures a trusted communication device amongst the one or more communication devices to deliver an updated version of the data payload to the security system to revoke the first communication device when the first communication device is lost.

3. The computer server of claim 1, wherein the data payload further includes a digital signature of the computer server, the digital signature being validatable by the security system to establish a communication relationship between the first communication device and the security system.

4. A communication device comprising:
a processor; and
a memory storing instructions when executed by the processor, cause the communication device to:
transmit a public key of the communication device to a security system for validation by the security system;
receive from the security system, a symmetric encryption key that is encrypted using the public key of the communication device;
decrypt the symmetric encryption key using a private key of the communication device;
use the decrypted symmetric encryption key to generate a one-time password; and
transmit the one-time password to the security system;
receive a data payload including an access control file cryptographically signed by a server and encrypted using the public key of the communication device, the access control file including permissions of the communication device to a security system, the security system being distinct from the server;
decrypt the data payload using a private key of the communication device;
validate the data payload to determine that the data payload is signed by the server; and
store the data payload in a storage location of the memory.

5. The communication device of claim 4, wherein the communication device is configured to deliver an updated version of the data payload to the security system to revoke access privileges of a lost communication device to the security system, the lost communication device being associated with the security system and previously provisioned using the data payload.

6. The communication device of claim 4, wherein the data payload includes a digital signature of the server of the security system, the digital signature being validatable by the security system to initiate a communication relationship between the communication device and the security system.

7. The communication device of claim 4, wherein the communication device includes a power source that wirelessly powers the security system.

8. The communication device of claim 4, wherein the communication device is configured to:
receive identifying information from the security system when in proximity to the security system; and
determine, based on received identifying information from the security system, whether the communication device has permission to actuate a locking member of the security system.

9. The communication device of claim 4, wherein the communication device is configured to:
determine that the communication device has previously established a symmetric key pair with the security system; and
initiate an authentication process request with the security system.

10. The communication device of claim 4, wherein the communication device is configured to:
receive, from the security system, an identifying number for the communication device, the identifying number being encrypted in association with the symmetric encryption key using the public key of the communication device;
decrypt the encrypted identifying number using the private key of the communication device; and
transmit the decrypted identifying number in association with the one-time password to the security system, the decrypted identifying number being used in association with the one-time password to actuate a locking member of the security system.

11. The communication device of claim 4, wherein the communication device is configured to communicate via near-field wireless communication.

12. A method comprising:
transmitting, by a first communication device to a security system, a public key of the first communication device;
generating, by the security system, an encrypted symmetric encryption key and an encrypted identifying number using the public key of the first communication device;
provisioning a first communication device with a data payload including an access control file, the access control file including permissions of the first communication device to a security system, the access control file being cryptographically signed by a server associated with the security system and encrypted using a key of the first communication device, the server associated with the security system being distinct from the security system;
transmitting the access control file from the first communication device to the security system, the security system validating a signature of the server associated with the security system in the access control file;
transmitting an encrypted symmetric encryption key and an encrypted identifying number from the security system to the first communication device responsive to validating the signature of the server associated with the security system in the access control file;
transmitting a one-time password and a decrypted identifying number from the first communication device to the security system, the one-time password being generated using the encrypted symmetric encryption key, and the decrypted identifying number being a decryption of the encrypted identifying number; and
actuating a locking member of the security system using the symmetric encrypted key and the decrypted identifying number.

13. The method of claim 12, further comprising determining whether the access control file is current relative to a previously received access control file prior to validating the signature of the server associated with the security system.

* * * * *